(12) United States Patent
Kakuk

(10) Patent No.: US 6,910,324 B2
(45) Date of Patent: Jun. 28, 2005

(54) MULTI-BLADED ROTARY CUTTING DECK WITH MULCHING AND DISCHARGE/COLLECTION MODES

(75) Inventor: Jay J. Kakuk, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/061,442

(22) Filed: Feb. 1, 2002

(65) Prior Publication Data
US 2003/0145572 A1 Aug. 7, 2003

(51) Int. Cl.⁷ .................... A01D 34/52; A01D 34/73
(52) U.S. Cl. .................... 56/255; 56/295; 56/320.2
(58) Field of Search ............... 56/320.1, 320.2, 56/255, 295, 17.4, 17.5, 6, DIG. 20, DIG. 24

(56) References Cited

U.S. PATENT DOCUMENTS

| | | | |
|---|---|---|---|
| 2,928,223 A | | 3/1960 | Danuser |
| 3,469,376 A | | 9/1969 | Bacon |
| 3,636,686 A | * | 1/1972 | Meyer et al. ............... 56/320.2 |
| 3,818,687 A | | 6/1974 | Houst et al. |
| 3,827,220 A | * | 8/1974 | Seidel ........................ 56/320.2 |
| 3,872,656 A | * | 3/1975 | Dahl ............................. 56/202 |
| 3,893,284 A | * | 7/1975 | Thon et al. .................... 56/202 |
| 3,949,540 A | * | 4/1976 | Christopherson et al. ...... 56/202 |
| 4,149,358 A | * | 4/1979 | Comer ........................ 56/13.4 |
| 4,203,276 A | * | 5/1980 | Plamper ....................... 56/202 |
| 4,226,074 A | | 10/1980 | Mullet et al. |
| 4,238,918 A | * | 12/1980 | Saruhashi et al. .......... 114/116 |
| 4,435,949 A | | 3/1984 | Heismann |
| 4,637,203 A | * | 1/1987 | Fedeli .......................... 56/202 |
| 4,856,265 A | * | 8/1989 | Wolf ......................... 56/320.2 |
| 4,951,449 A | | 8/1990 | Thorud et al. |
| 5,090,183 A | * | 2/1992 | Thorud et al. .................... 56/2 |
| 5,205,112 A | * | 4/1993 | Tillotson et al. ................. 56/2 |
| 5,305,589 A | * | 4/1994 | Rodriguez et al. ......... 56/320.1 |
| 5,355,666 A | * | 10/1994 | McDonner et al. ........... 56/255 |
| 5,442,902 A | | 8/1995 | Mosley et al. |
| 5,499,494 A | | 3/1996 | Boshell et al. |
| 5,761,891 A | * | 6/1998 | Ferrari ............................. 56/6 |
| 5,826,416 A | | 10/1998 | Sugden et al. |
| 5,960,619 A | * | 10/1999 | Seidel et al. ................... 56/255 |
| 6,065,276 A | * | 5/2000 | Hohnl et al. ................ 56/320.1 |
| 6,189,307 B1 | * | 2/2001 | Buss et al. .................. 56/320.1 |
| 6,192,666 B1 | * | 2/2001 | Sugden et al. ............. 56/320.2 |
| 6,195,969 B1 | * | 3/2001 | Yilmaz ....................... 56/14.7 |
| 6,490,851 B2 | * | 12/2002 | Kutsukake ................. 56/320.1 |
| 6,694,716 B1 | * | 2/2004 | Osborne ....................... 56/202 |

* cited by examiner

Primary Examiner—Arpad Fabian Kovacs
(74) Attorney, Agent, or Firm—James W. Miller

(57) ABSTRACT

A rotary cutting deck has dual, side-by-side cutting chambers each of which houses a rotary cutting blade. The blades rotate so that grass clippings exit to the rear of the cutting deck through a central, rearwardly extending exit tunnel. A pivotal mulch door is located within the exit tunnel with the mulch door swinging between two positions. In one position, the exit tunnel is open to permit operation of the cutting deck in a discharge/collection mode of operation. In the other position, the exit tunnel is closed to convert the cutting deck to a mulching mode of operation. A V-shaped baffle with a forwardly facing apex is placed in the bottom and rear of the exit tunnel to enhance performance in the mulching mode of operation.

27 Claims, 3 Drawing Sheets

MULTI-BLADED ROTARY CUTTING DECK WITH MULCHING AND DISCHARGE/COLLECTION MODES

TECHNICAL FIELD

This invention relates to a multi-bladed rotary cutting deck which is convertible between mulching and discharge/collection modes of operation.

BACKGROUND OF THE INVENTION

Multi-bladed rotary cutting decks are known which have dual, side-by-side cutting chambers. Each cutting chamber encloses a cutting blade that is rotatable about a substantially vertical axis such that the cutting blade rotates in a substantially horizontal cutting plane. The blades rotate oppositely to one another such that the grass clippings generated by each cutting blade merge together into a common grass clipping stream. A rearwardly extending and rearwardly opening exit tunnel on the cutting deck receives this grass clipping stream to allow the stream to exit to the rear of the cutting deck, either for discharge onto the ground or for collection in a grass bagging apparatus. Thus, the cutting deck has a first discharge/collection mode of operation when the exit tunnel is open and permits the grass clipping stream to exit from the cutting deck.

Known rotary cutting decks of the type described above can be converted to a mulching mode of operation in which the grass clipping stream is prevented from passing through the exit tunnel. In this mulching mode, the grass clipping stream is confined within the cutting chambers to allow the grass clippings to be recut. Eventually, the grass clippings either fall or are driven out of the cutting chambers in a downward direction through the open bottom of the cutting chambers. The rotary cutting deck is converted or switched to the mulching mode of operation by selectively closing off the exit tunnel on the deck so that the grass clipping stream can no longer pass through the exit tunnel.

In converting a rotary cutting deck of the type described above to its mulching mode of operation, a separate mulching plug is typically used which must be inserted through the open rear end of the exit tunnel to block or close off the exit tunnel. This can be difficult to do given the placement of the cutting deck relative to the rest of the mower and given the fact that the exit tunnel is in the center of the deck along a rear side of the deck and is not at the side of the deck. Thus, converting the rotary cutting deck to the mulching mode by manually inserting a plug into the exit tunnel is not as easy as would be desirable.

Moreover, the conversion of the rotary cutting deck to the mulching mode means that the mulching plug must be on hand and available to the user or operator. If the user or operator of the rotary cutting deck is out in the field cutting grass when he or she wishes to make the conversion between the discharge/collection mode and the mulching mode, this can be done only if the mulching plug is actually being carried on the mower. The mulching plug is most likely back at the shop or garage. This requires that the operator go back to the shop or garage to pick up the mulching plug before the rotary cutting deck can be converted to the mulching mode of operation. This is obviously a disadvantage of a system that requires a separate mulching plug to convert the rotary cutting deck to the mulching mode.

In addition, the mulching plug is prone to being lost or misplaced. If this happens, the operator cannot convert the rotary cutting deck to the mulching mode without finding or replacing the mulching plug. Again, this can be inconvenient and annoying.

SUMMARY OF THE INVENTION

One aspect of this invention relates to a rotary cutting deck for a mower which comprises a cutting deck having side-by-side cutting chambers. A cutting blade is contained in each cutting chamber. Each cutting blade is rotatable about a substantially vertical axis in a horizontal cutting plane to cut grass and create grass clippings. The grass clippings created by the cutting blades are directed longitudinally on the cutting deck between the rotational axes of the cutting blades. A longitudinally extending exit tunnel is located on the cutting deck between the rotational axes of the cutting blades in a position to intercept the grass clippings created by the cutting blades. A pivotal mulch door is located inside the exit tunnel for pivotal movement between a first position in which the exit tunnel is open and a second position in which the exit tunnel is closed, whereby the exit tunnel can be open in the first position of the mulch door to provide a discharge/collection mode of operation or can be closed in the second position of the mulch door to provide a mulching mode of operation.

Another aspect of this invention relates to a rotary cutting deck which comprises a cutting deck having dual, side-by-side cutting chambers each of which houses a rotary cutting blade. The blades rotate so that grass clippings are directed towards the rear of the cutting deck through a central, rearwardly extending exit tunnel. A pivotal mulch door is located within the exit tunnel with the mulch door swinging between one position in which the exit tunnel is open to permit operation of the cutting deck in a discharge/collection mode of operation and another position in which the exit tunnel is closed to convert the cutting deck to a mulching mode of operation. A V-shaped baffle with a forwardly facing apex is placed in the bottom and rear of the exit tunnel.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 2:
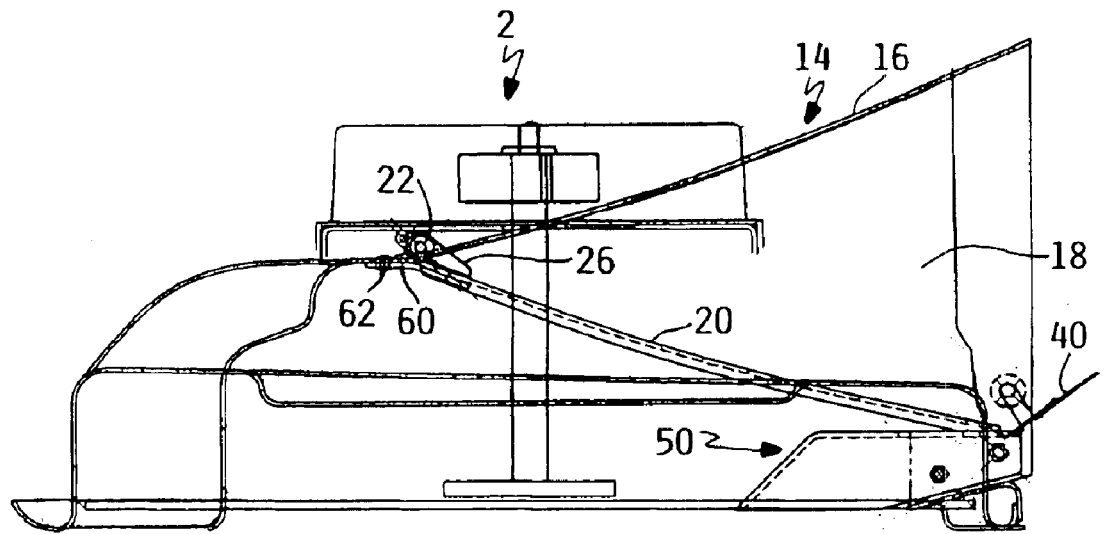
FIG. 2 is a cross-sectional view of the rotary cutting deck of FIG. 1, taken along lines 2—2 in FIG. 1, particularly illustrating the pivotal mulch door in its lowered position in which the exit tunnel is closed to place the rotary cutting deck in its mulching mode of operation.

A rotary cutting deck according to this invention is illustrated generally as 2. Rotary cutting deck 2 is so named because the grass is cut by multiple cutting blades 4 each of which rotates in horizontal cutting planes. One such cutting blade 4 is shown in FIG. 2.

Figure 1:
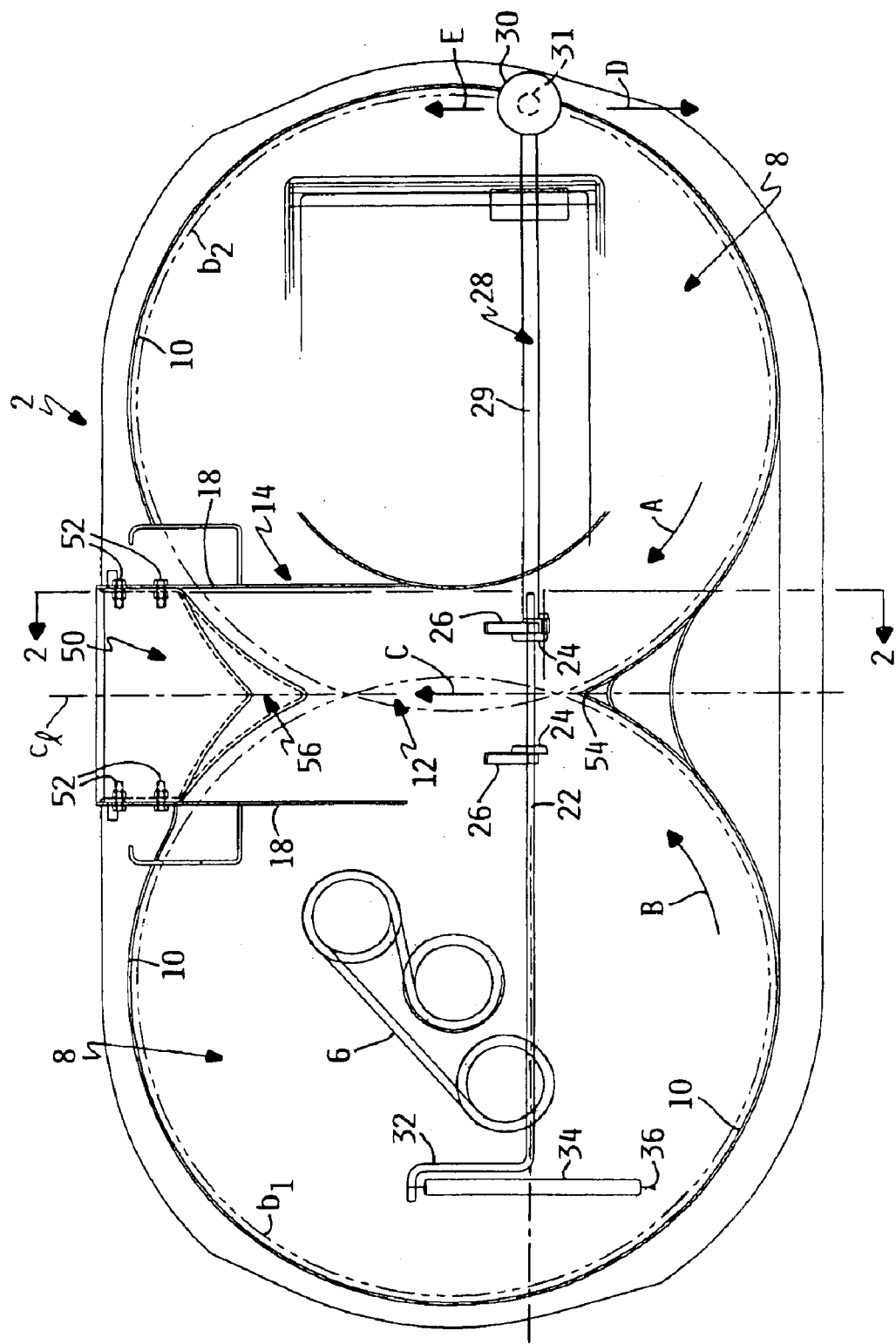
FIG. 1 is a partial top plan view of a rotary cutting deck according to this invention illustrating the configuration of the dual, side-by-side cutting chambers in solid lines for the purpose of clarity, but with the top wall of the exit tunnel and the pivotal mulch door being omitted from FIG. 1 to better illustrate the V-shaped baffle shown at the rear and bottom of the exit tunnel.

The orbits of the tips of cutting blades 4 are indicated in FIG. 1 as $b_1$ and $b_2$. Because blade orbits $b_1$ and $b_2$ intersect over the centerline $c_1$ of rotary cutting deck 2, cutting blades 4 are timed in their rotation so as not to hit one another. For example, cutting blades 4 are rotated by a belt drive system 6, a portion of which is shown in FIG. 1, utilizing a cogged timing belt or the like.

Each cutting blade 4 has sharpened cutting edges (not shown) which sever uncut grass as cutting blades 4 are rotated in their horizontal cutting planes. The height of cut can be adjusted by changing the vertical height of rotary cutting deck 2 above the ground in ways that are well known in the grass mowing art.

The underside of rotary cutting deck 2 has dual, generally circular, side-by-side cutting chambers 8. Each cutting chamber 8 is defined by a curved, peripheral wall 10 that is C-shaped and which extends around a portion of the front and back and around one outer side of rotary cutting deck 2. The open part of C-shaped wall 10 is at the interior of rotary cutting deck 2 generally in the middle of rotary cutting deck 2. The purpose of the open part of C-shaped wall 10 is to let dual cutting chambers 8 be open to or communicate with one another along the centerline $c_1$ of rotary cutting deck 2, as indicated generally at 12.

As noted earlier, cutting blades 4 are rotated by any suitable belt drive system 6 or other drive system as is well known in the mower art such that cutting blades 4 rotate oppositely to one another without hitting one another. Looking down at rotary cutting deck 2 shown in FIG. 1, if one cutting blade 4 rotates clockwise as is indicated by the arrow A, then the other cutting blade 4 rotates counter-clockwise as is indicated by the arrow B. Thus, the grass clippings being cut in each cutting chamber 8 will merge or commingle with one another to form a common stream of grass clippings located generally in the center of rotary cutting deck 2 between the rotational axes of cutting blades 4. The grass clipping stream will be directed rearwardly towards the rear of rotary cutting deck 2 as indicated by the arrow C in FIG. 1.

A rearwardly directed exit tunnel 14 is provided on top of rotary cutting deck 2 to form a rear exit for the grass clipping stream. Exit tunnel 14 is generally U-shaped having a top wall 16 and vertically extending side walls 18, with top wall 16 not being shown in FIG. 1 for the purpose of clarity but with top wall 16 being shown in FIGS. 2 and 3. Exit tunnel 14 increases in height from its beginning near the center of rotary cutting deck 2 to its end along the rear side of rotary cutting deck 2. In other words, top wall 16 of exit tunnel 14 slants upwardly as exit tunnel 14 extends rearwardly and side walls 18 of exit tunnel 14 increase in height as exit tunnel 14 proceeds rearwardly. See FIG. 2. Exit tunnel 14 forms an exit path so that the grass clipping stream from cutting chambers 8 can exit from rotary cutting deck 2 in a discharge/collection mode of operation of rotary cutting deck 2.

A pivotal mulch door 20 is provided in exit tunnel 14 to convert rotary cutting deck 2 from a discharge/collection mode of operation to a mulching mode of operation. A pivot shaft 22 extends transversely on top of rotary cutting deck 2 with pivot shaft 22 being journalled for rotation by support brackets 24 on the top of rotary cutting deck 2. A pair of hinges 26 extend from pivot shaft 22 through slots in top wall 16 of exit tunnel 14 to attach to the front end of mulch door 20 to pivotally journal mulch door 20 on pivot shaft 22. While hinges 26 extend from pivot shaft 22 through top wall 16 of exit tunnel 14, mulch door 20 is itself located within exit tunnel 14.

The front end of mulch door 20 is located at the front of exit tunnel 14 where top wall 16 of exit tunnel 14 begins to rise up out of rotary cutting deck 2. The rear end of mulch door 20 is located adjacent the rear of exit tunnel 14 where exit tunnel 14 discharges the grass clipping stream out of the rear side of rotary cutting deck 2.

One end of pivot shaft 22 is secured to an L-shaped handle 28 that can be used by the operator to rotate pivot shaft 22, and hence rotate mulch door 20, relative to rotary cutting deck 2. Handle 28 has a transverse horizontal arm 29 secured to pivot shaft 22 and an upwardly extending vertical arm 31. A knob 30 that can be gripped by the operator is located on top of vertical arm 31 of handle 28 well above rotary cutting deck 2. This L-shaped handle 28 allows the operator to grip knob 30 and rotate pivot shaft 22 by pivoting vertical arm 31 of handle 28 towards the front or rear sides of rotary cutting deck 2 as indicated by the arrows D and E in FIG. 1.

The other end of pivot shaft 22 is formed with an offset L-shaped crank portion 32. An elongated extension spring 34 extends between crank portion 32 of pivot shaft 22 and a fixed attachment or anchor 36 to rotary cutting deck 2. Crank portion 32 of pivot shaft 22 and extension spring 34 are so arranged and configured as to provide an overcenter biasing system that holds pivot shaft 22 in one of two stable positions.

Figure 3:
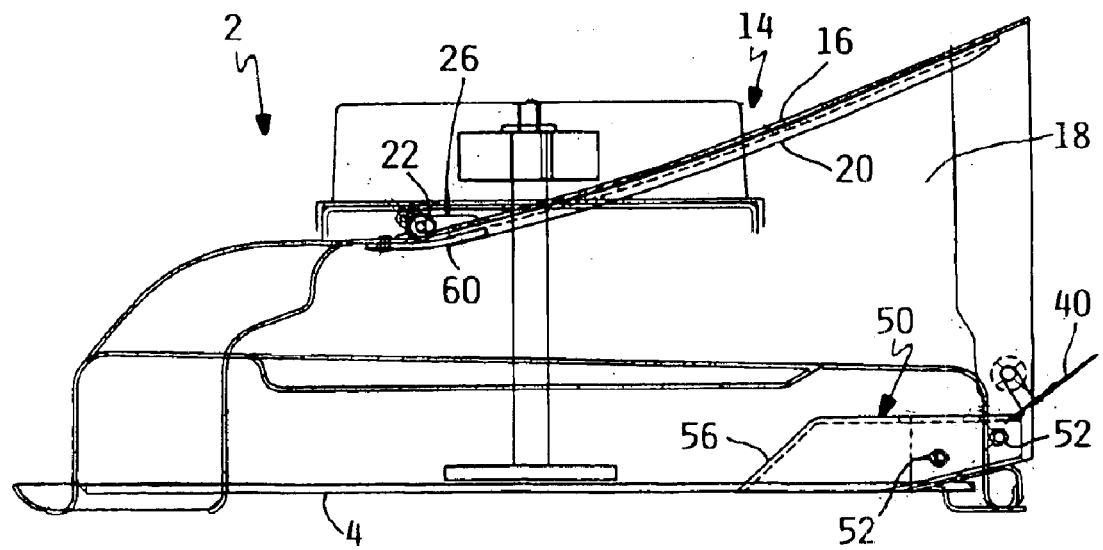
FIG. 3 is a cross-sectional view similar to FIG. 2, but particularly illustrating the pivotal mulch door in its raised position in which the exit tunnel is open to place the rotary cutting deck in its discharge/collection mode of operation.

In the discharge/collection mode of operation, mulch door 20 is located in a first raised position relative to exit tunnel 14 such that mulch door 20 lies closely adjacent and beneath top wall 16 of exit tunnel 14 so as leave the exit path formed by exit tunnel 14 open. This raised position of mulch door 20 is illustrated in FIG. 3. With the rear of exit tunnel 14 open, the grass clipping stream generated by the operation of dual cutting blades 8 is free to exit from rotary cutting deck 2 through exit tunnel 14. This stream of grass clippings can either be discharged onto the ground or collected in some type of bagging apparatus that might be optionally attached to the rear of exit tunnel 14, thus giving rise to the name of the discharge/collection mode of operation.

Figure 5:
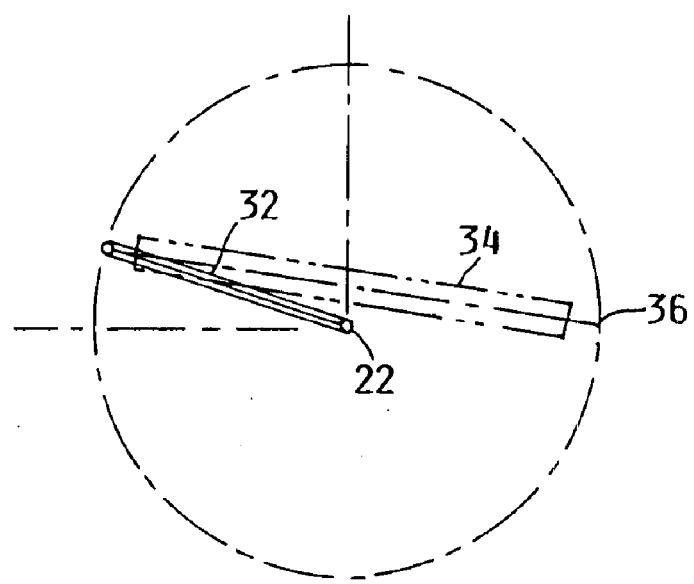
FIG. 5 is a diagrammatic or schematic view of one end of the pivot shaft of the pivotal mulch door showing the position of the overcenter biasing spring in the raised position of the mulch door.

In the discharge/collection mode, mulch door 20 is held in its raised position by extension spring 34 acting on crank portion 32 of pivot shaft 22. The position of crank portion 32 and extension spring 34 when mulch door 20 is in its raised position is illustrated in FIG. 5.

To convert rotary cutting deck 2 to a mulching mode of operation, the operator grabs knob 30 on handle 28 and rotates pivot shaft 22 to pivot mulch door 20 from the raised position to a lowered position. As shown in FIG. 2, mulch door 20 in the lowered position has been pivoted downwardly to close off or block exit tunnel 14 so that passage of the grass clippings stream from exit tunnel 14 is no longer possible. As shown in FIG. 2, in the lowered position of mulch door 20, mulch door 20 is no longer flush with top wall 16 of exit tunnel 14, but slants downwardly relative to top wall 16 of exit tunnel 14 until the rear end of mulch door 20 abuts against a grass guide surface 40 located at the bottom of exit tunnel 14. The grass clipping stream now no longer has an exit path through exit tunnel 14, the exit path now being blocked by the lowered pivotal mulch door 20.

Figure 4:
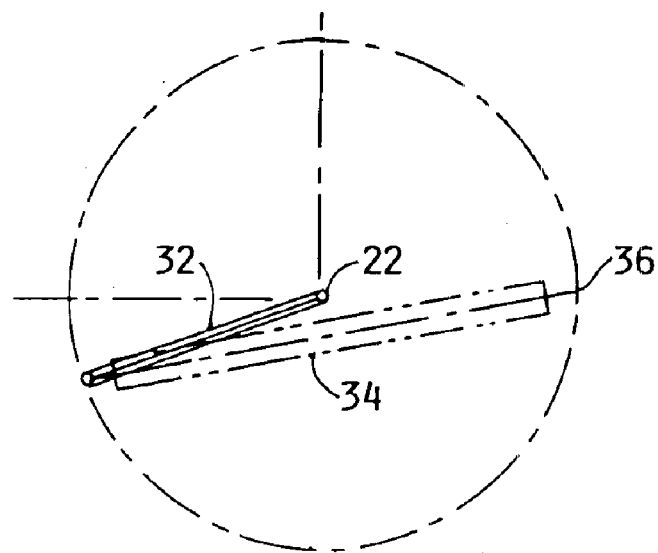
FIG. 4 is a diagrammatic or schematic view of one end of the pivot shaft of the pivotal mulch door showing the position of the overcenter biasing spring in the lowered position of the mulch door.

In the mulching mode, mulch door 20 is also held in its lowered position by extension spring 34 acting on crank portion 32 of pivot shaft 22. The only difference is that rotation of pivot shaft 22 has also rotated crank portion 32 to move the end of extension spring 34 connected to crank portion 32 overcenter relative to the anchored or fixed end of extension spring 34. The position of crank portion 32 and extension spring 34 when mulch door 20 is in its lowered position is illustrated in FIG. 4.

The Applicant has also found that performance of rotary cutting deck 2 in the mulching mode is enhanced by the addition of a V-shaped baffle 50 to the rear of exit tunnel 14 at the bottom of exit tunnel 14. This V-shaped baffle 50 may be bolted by bolts 52 to side walls 18 of exit tunnel 14. V-shaped baffle 50 serves to extend the peripheral circular wall 10 of the two cutting chambers 8 around at the rear of rotary cutting deck 2 so that cutting chambers 8 have generally symmetrical configurations both at the front and rear of rotary cutting deck 2. In other words, the two cutting chambers 8 come together at a V-shaped apex 54 at the front of rotary cutting deck 2 along the centerline $c_1$ of rotary cutting deck 2. V-shaped baffle 50 when added to the rear of rotary cutting deck 2 merely provides the same type of V-shaped apex 56 at the rear as the apex 54 that is found at the front of rotary cutting deck 2. However, unlike the front V-shaped apex 54 which is a vertically extending edge, the apex 56 provided by V-shaped baffle 50 is slanted rearwardly as it extends upwardly. See FIG. 2.

Use of V-shaped baffle 50 at the rear and bottom of exit tunnel 14 has been found to promote better grass clipping distribution in the mulching mode than when V-shaped baffle 50 is absent. It is thought that baffle 50 intercepts the grass clipping stream trying to exit through exit tunnel 14 and divides such stream into separate halves that are then recirculated in dual cutting chambers 8.

A flexible flap or cover 60 can extend over and cover the underside of the front end off mulch door 20. The front portion of cover 60 is pinned or otherwise fixed as indicated at 62 to the underside of rotary cutting deck 2 while the rear portion of cover 60 is attached to the front end of mulch door 20. The rear portion of cover 60 can flex up and down relative to the front portion of cover 60 such that the rear portion of cover 60 moves with mulch door 20 as mulch door 20 is raised and lowered. Cover 60 helps prevent grass or other debris from wedging against the front end of mulch door 20 or from fouling the action of hinges 26.

Rotary cutting deck 2 according to this invention is easily convertible by an operator from the discharge/collection mode of operation to the mulching mode of operation. The operator need only grab handle 28, which is conveniently located along one side of rotary cutting deck 2, and rotate pivot shaft 22 to pivot mulch door 20 from its raised to its lowered position. This can be easily and conveniently done without having to attempt to insert some type of plug into the rear end of exit tunnel 14. Moreover, since mulch door 20 is always attached to rotary cutting deck 2, there is no need for the operator to find such a separate plug and no danger of losing such a plug since no plug is required. Accordingly, rotary cutting deck 2 of this invention can be more easily converted from one mode of operation to another than similar known cutting decks using a separate, insertable mulching plug.

Various modifications of this invention will be apparent to those skilled in the art. For example, use of V-shaped baffle 50 at the bottom and rear of exit tunnel 14 is preferred to provide better performance in the grass mulching mode. However, V-shaped baffle 50 could be deleted and pivotal mulch door 20 used without such a baffle if one were willing to accept less efficient performance in the mulching mode. Pivotal mulch door 20 in itself provides various advantages whether or not V-shaped baffle 50 is also used.

In addition, the location of the offset crank portion 32 of pivot shaft 22 and extension spring 34 can obviously vary. For example, pivot shaft 22 could be formed with a U-shaped offset crank portion located between vertical arm 31 of handle 28 and shaft support brackets 24. Spring 34 would extend from the base of such U-shaped crank portion and a fixed attachment or anchor to rotary cutting deck 2. Thus, the shape and location of the overcenter biasing system provided by crank portion 32 and extension spring 34 is not limited to that shown in the drawings.

Moreover, rotary cutting deck 2 can be attached in any suitable manner to a traction frame (not shown), which may be part of either a walk behind or riding mower, to allow rotary cutting deck 2 to be moved over the ground. Belt drive system 6 may be powered from some type of prime mover or other power source carried on the traction frame. The nature of the type of traction frame and mower to which rotary cutting deck 2 is attached, and how rotary cutting deck 2 is so attached, is not important to or part of this invention.

Thus, the scope of this invention will be limited only by the appended claims.

I claim:

1. A rotary cutting deck for a mower, which comprises:
    (a) a cutting deck having dual, side-by-side, downwardly facing cutting chambers which are open to one another generally over a central portion of the cutting deck;
    (b) a cutting blade contained in each cutting chamber, wherein each cutting blade is rotatable about a substantially vertical axis in a horizontal cutting plane to cut grass and create grass clippings, wherein the cutting blades in the dual chambers rotate in opposite directions which are chosen so that the grass clippings created by the cutting blades merge together in a stream of grass clippings that is directed rearwardly on the cutting deck between the rotational axes of the cutting blades;
    (c) a rearwardly extending exit tunnel located on the central portion of the cutting deck between the rotational axes of the cutting blades in a position to intercept the grass clipping stream created by the cutting blades;
    (d) a pivotal mulch door inside the exit tunnel for pivotal movement between a first position in which the exit tunnel is open and a second position in which the exit tunnel is closed, whereby the exit tunnel can be open in the first position of the mulch door to provide a discharge/collection mode of operation or can be closed in the second position of the mulch door to provide a mulching mode of operation;
    (e) a laterally extending pivot shaft rotatably carried on the central portion of the cutting deck adjacent the exit tunnel, the pivot shaft being connected to the mulch door for pivoting the mulch door within the exit tunnel between the first and second positions thereof as the pivot shaft rotates in opposite directions relative to the cutting deck; and
    (f) a laterally extending arm having an inner end overlying the central portion of the cutting deck with the inner end of the arm being fixed to the pivot shaft for rotating the pivot shaft, the arm having an outer end laterally separated from the inner end of the arm and from the mulch door and the exit tunnel with the outer end of the arm being located adjacent one side of the cutting deck when the inner end of the arm overlies the central portion of the cutting deck, the outer end of the arm carrying a member that is selectively operable by a user to rotate the arm and thus the pivot shaft from a position remote from the exit tunnel and the mulch door along the one side of the cutting deck.

2. The rotary cutting deck of claim 1, wherein the cutting chambers are open to one another over a longitudinal centerline of the cutting deck.

3. The rotary cutting deck of claim 1, wherein the first position of the mulch door is a raised position of the mulch door relative to the exit tunnel and the second position of the mulch door is a lowered position of the mulch door relative to the exit tunnel.

4. The rotary cutting deck of claim 1, wherein the exit tunnel includes a top wall and vertically extending side walls extending between the top wall and the cutting deck.

5. The rotary cutting deck of claim 4, wherein the exit tunnel ends at a rear opening along a rear side of the cutting deck.

6. The rotary cutting deck of claim 4, wherein the exit tunnel increases in height as it extends rearwardly on the cutting deck with the top wall of the exit tunnel slanting upwardly relative to the cutting deck as the exit tunnel extends rearwardly and the side walls of the exit tunnel increasing in height as the exit tunnel extends rearwardly.

7. The rotary cutting deck of claim 1, wherein the selectively operable member attached to the outer end of the arm comprises a hand operated handle secured to the pivot shaft for allowing an operator to rotate the pivot shaft.

8. The rotary cutting deck of claim 1, wherein one end of the pivot shaft is formed as an offset crank portion, and further including an extension spring secured between the offset crank portion of the pivot shaft and a fixed anchor on the cutting deck such that the extension spring and offset crank portion form an overcenter biasing system that holds the mulch door in the first and second positions thereof.

9. The rotary cutting deck of claim 1, further including means for holding the mulch door in the first and second positions thereof.

10. The rotary cutting deck of claim 1, wherein a V-shaped baffle having a forwardly facing apex is located at the bottom of the exit tunnel.

11. The rotary cutting deck of claim 10, wherein the V-shaped baffle is also located at the rear of the exit tunnel.

12. The rotary cutting deck of claim 10, wherein the V-shaped baffle extends between opposite side walls of the exit tunnel.

13. The rotary cutting deck of claim 10, further including a front, rearwardly facing integral apex joining the cutting chambers together along a front side of the cutting deck, and wherein the V-shaped baffle is located on the cutting deck with the forwardly facing integral apex of the V-shaped baffle being aligned with the rearwardly facing front apex along a longitudinal centerline of the cutting deck.

14. A rotary cutting deck for a mower, which comprises:
(a) a cutting deck having side-by-side cutting chambers;
(b) a cutting blade contained in each cutting chamber, wherein each cutting blade is rotatable about a substantially vertical axis in a horizontal cutting plane to cut grass and create grass clippings, wherein the grass clippings created by the cutting blades are directed longitudinally on the cutting deck between the rotational axes of the cutting blades;
(c) a longitudinally extending exit tunnel located on the cutting deck between the rotational axes of the cutting blades in a position to intercept the grass clippings created by the cutting blades, wherein the exit tunnel includes a front end located over a central portion of the cutting deck and a rear opening generally along a rear side of the cutting deck; and
(d) a pivotal mulch doer inside the exit tunnel for pivotal movement between a first position in which the exit tunnel is open and a second position in which the exit tunnel is closed, whereby the exit tunnel can be open in the first position of the mulch door to provide a discharge/collection mode of operation or can be closed in the second position of the mulch door to provide a mulching mode of operation, wherein the mulch door has a front end positioned at the front end of the exit tunnel and a rear end positioned adjacent the rear opening of the exit tunnel, and wherein the mulch door is pivoted to the front end of the exit tunnel at the front end of the mulch door.

15. The rotary cutting deck of claim 14, wherein the grass clippings are directed longitudinally parallel to a longitudinal centerline of the cutting deck.

16. The rotary cutting deck of claim 14, further including a selectively operable member located adjacent one side of the cutting deck for pivoting the mulch door.

17. A rotary cutting deck, which comprises:
(a) a cutting deck having dual, side-by-side cutting chambers each of which houses a rotary cutting blade, wherein the blades rotate so that grass clippings are directed towards the rear of the cutting deck through a central, rearwardly extending exit tunnel on the cutting deck;
(b) a pivotal mulch door located within the exit tunnel with the mulch door swinging between one position in which the exit tunnel is open to permit operation of the cutting deck in a discharge/collection mode of operation and another position in which the exit tunnel is closed to convert the cutting deck to a mulching mode of operation; and
(c) a V-shaped baffle with a forwardly facing apex placed in the bottom and rear of the exit tunnel.

18. A rotary cutting deck for a mower, which comprises:
(a) a cutting deck having dual, side-by-side, downwardly facing cutting chambers;
(b) a cutting blade contained in each cutting chamber, wherein each cutting blade is rotatable about a substantially vertical axis in a horizontal cutting plane to cut grass and create grass clippings, wherein the cutting blades in the dual chambers rotate in opposite directions and the cutting chambers are configured so that the grass clippings created by the cutting blades merge together in a single stream of grass clippings that is directed between the rotational axes of the cutting blades;
(c) an exit tunnel located on the cutting deck between the rotational axes of the cutting blades in a position to intercept the grass clipping stream created by the cutting blades;
(d) a pivotal mulch door inside the exit tunnel for pivotal movement between a first position in which the exit tunnel is open and a second position in which the exit tunnel is closed, whereby the exit tunnel can be open in the first position of the mulch door to provide a discharge/collection mode of operation or can be closed in the second position of the mulch door to provide a mulching mode of operation; and
(e) a member that is operatively connected to the mulch door and that is selectively operable by a user to pivot the mulch door between the first and second positions of the mulch door, wherein the selectively operable member is laterally spaced from the exit tunnel and is located adjacent one side of the cutting deck to allow the user to pivot the mulch door from a position remote from the exit tunnel along the one side of the cutting deck.

19. The rotary cutting deck of claim 18, wherein the selectively operable member is secured to a lateral outer end of a transverse arm, the arm operatively connecting the selectively operable member to the mulch door to pivot the mulch door as the arm is rotated by the selectively operable member.

20. The rotary cutting deck of claim 19, wherein the selectively operable member comprises a hand operated handle.

21. A rotary cutting deck for a mower, which comprises:
   (a) a cutting deck having at least one cutting blade that is rotatable about a substantially vertical axis in a horizontal cutting plane to cut grass and create grass clippings within the deck;
   (b) an exit tunnel located on top of the cutting deck in a position to intercept the grass clippings, wherein the exit tunnel is generally U-shaped having a top wall, vertical side walls and a generally open bottom side located over a forward portion of the exit tunnel with grass clippings entering the exit tunnel through the open bottom side, wherein the tunnel increases in height from a front end of the exit tunnel to a rear end of the exit tunnel;
   (c) a pivotal mulch door located within the exit tunnel with the mulch door swinging between a first position in which the exit tunnel is open to permit the grass clippings to pass through the exit tunnel and a second position in which the exit tunnel is closed to block the grass clippings from passing through the exit tunnel; and
   (d) wherein the mulch door in the first position thereof clears the open bottom side of the exit tunnel and in the second position thereof closes off the exit tunnel by blocking the generally open bottom side of the exit tunnel to prevent the grass clippings from entering the exit tunnel.

22. The rotary cutting deck of claim 21, wherein the generally open bottom side of the exit tunnel is obstructed by a baffle placed in the bottom and rear of the exit tunnel, and wherein the mulch door in the second position has a rear end lying atop the baffle as the mulch door blocks the generally open bottom side of the exit tunnel.

23. The rotary cutting deck of claim 21, wherein the pivotal mulch door pivots about an axis that lies forwardly of the rear end of the exit tunnel.

24. The rotary cutting deck of claim 22, wherein the pivot axis of the mulch door lies adjacent the front end of the exit tunnel.

25. The rotary cutting deck of claim 21, wherein the cutting deck has dual, side-by-side cutting chambers each of which houses a rotary cutting blade, wherein the cutting blades in the dual chambers rotate in opposite directions and the cutting chambers are configured so that the grass clippings created by the cutting blades merge together into a stream of grass clippings, and wherein the exit tunnel is positioned to receive the stream of grass clippings from both of the cutting chambers.

26. The rotary cutting deck of claim 21, wherein the mulch door in the first position thereof lies substantially flush with the top wall of the exit tunnel.

27. A rotary cutting deck for a mower, which comprises:
   (a) a cutting deck having at least one cutting blade that is rotatable about a substantially vertical axis in a horizontal cutting plane to cut grass and create grass clippings within the deck;
   (b) an exit tunnel located on top of the cutting deck in a position to intercept the grass clippings, wherein the exit tunnel increases in height from a front end of the exit tunnel located generally where the exit tunnel begins to rise in height relative to the cutting deck to a rear end of the exit tunnel located generally along a rear side of the cutting deck; and
   (c) a pivotal mulch door located within the exit tunnel with the mulch door swinging between a first position in which the exit tunnel is open to permit the grass clippings to pass through the exit tunnel and a second position in which the exit tunnel is closed to block the grass clippings from passing through the exit tunnel, wherein a front end of the mulch door is pivoted adjacent the front end of the exit tunnel.

* * * * *